United States Patent [19]
Lockery et al.

[11] 4,282,748
[45] Aug. 11, 1981

[54] MECHANICAL MOMENT SENSITIVITY COMPENSATION IN SHEAR BEAM TRANSDUCERS

[75] Inventors: Harry E. Lockery, Sudbury; Eric Laimins, Belmont, both of Mass.

[73] Assignee: Hottinger Baldwin Measurements, Inc., Framingham, Mass.

[21] Appl. No.: 52,613

[22] Filed: Jun. 27, 1979

[51] Int. Cl.³ .............................................. G01L 1/04
[52] U.S. Cl. .................................. 73/862.66; 73/1 B
[58] Field of Search ........................... 73/141 A, 1 B

[56] References Cited

U.S. PATENT DOCUMENTS

| 3,949,603 | 4/1976 | Laimins | 73/141 A |
| 3,960,228 | 6/1976 | Nordstrom | 73/141 A |
| 3,994,161 | 11/1976 | Trozera | 73/141 A |
| 4,009,608 | 3/1977 | Ormond | 73/141 A |
| 4,020,686 | 5/1977 | Brendel | 73/141 A |
| 4,128,001 | 12/1978 | Marks | 73/1 B |

Primary Examiner—Donald O. Woodiel
Attorney, Agent, or Firm—W. G. Fasse; D. F. Gould

[57] ABSTRACT

The moment sensitivity of shear beam transducers is mechanically compensated to make such transducers relatively insensitive to load applications which are off-center relative to an optimal point of load application. Such shear beam transducers have a free end forming a load application section, a mounting section, and a fillet located substantially where the sections merge. The compensation is made by providing the fillet initially with a larger radius than the final compensating radius. The compensation is made by gradually changing the fillet radius until the transducer output shows substantially no difference between the measurement resulting from applying a defined load in the optimal loading point and the measurement resulting from applying the same load off-center the optimal loading point whereby the transducer becomes substantially insensitive to such off-center load applications.

11 Claims, 5 Drawing Figures

MECHANICAL MOMENT SENSITIVITY COMPENSATION IN SHEAR BEAM TRANSDUCERS

BACKGROUND OF THE INVENTION

The present invention relates to a method for the mechanical compensation of moment sensitivity in shear beam transducers. The invention also relates to shear beam transducers which have been compensated in the mechanical manner disclosed herein.

The load sensitivity of a shear beam transducer should be ideally a constant value for a corresponding constant load regardless whether the load has been applied in the optimal loading point or off-center thereto. However, such constant relationship between the load and the sensitivity or output of the transducer is subject to certain influences which adversely affect the load sensitivity and thus the respective output which is indicated in millivolts per volt. For example, the constant relationship between the load and the output is assured only if the load is applied to the so-called optimal point of load application located on the optimal point of load application axis. If the actual point of load application shifts away from the optimal point, the output of the transducer may vary in an undesirable manner in one or the other direction. Thus, the output of the transducer may be larger or smaller than it should be for the given load value. This deviation is referred to in this disclosure as the moment sensitivity of the shear beam transducer. It is desirable to minimize this moment sensitivity and ideally reduce it to zero.

U.S. Pat. No. 3,949,603 discloses an electrical compensating method for minimizing this moment sensitivity of shear beam transducers. Such electrical compensation makes the transducer relatively insensitive to variations in the actual position of the point of load application relative to the optimal point of load application.

It has also been suggested in U.S. Pat. No. 3,960,228 to avoid off-center load applications by drilling a hole into the free end of the shear beam transducer to make sure that the applied load is directed in the optimal load measuring direction. However, from a practical point of view the precision required for such accurate load application exactly along the optimal load application axis, is too expensive and still does not assure that the desired result is always achieved.

OBJECTS OF THE INVENTION

In view of the above it is the aim of the invention to achieve the following objects singly or in combination:

to mechanically adjust the moment sensitivity as defined above in the longitudinal direction of a shear beam transducer to such an extent that the moment sensitivity becomes substantially zero;

to achieve said compensation either solely by mechanical means or by mechanical and electrical means in combination;

to improve the relationship between the moment sensitivity and the point of load application so that said relationship is linear throughout a certain range within which the point of load application may deviate from the optimal point of load application in the longitudinal direction of the load application section of the shear beam transducer in an outboard or an inboard direction relative to the mounting section; and to provide an empirical method for compensating the moment sensitivity of shear beam transducers by initially providing the fillet with a larger radius which is then changed or adjusted gradually until the moment sensitivity becomes substantially zero whereby the proper radius for the fillet may be ascertained for any given type of shear beam transducer only once and all transducers of the same type may then be provided with the same, compensating fillet radius.

SUMMARY OF THE INVENTION

According to the invention there is provided a method for mechanically compensating the moment sensitivity of a shear beam transducer which comprises the following steps: a load application axis extending through an optimal loading point is established for the shear beam transducer. The fillet between the load application section and the mounting section is initially provided with a radius which differs from a final compensating radius. A defined load is then applied to the shear beam transducer in said optimal loading point along the optimal load application axis. The respective transducer output is measured in millivolts per volt. The defined load is then applied off-center relative to the optimal loading point and the respective transducer output is again measured. The two transducer outputs are then compared with each other to ascertain any difference therebetween. The fillet radius is then mechanically changed and the loading, measuring, and comparing is repeated. If necessary, the fillet radius is further changed until the output difference is substantially zero, whereby the shear beam transducer is made substantially insensitive to off-center load applications.

According to the invention there is further provided a shear beam transducer having a free end load application section and a mounting section which form a merging zone provided with a fillet or gusset having a radius adjusted to an optimum value such that the transducer is substantially insensitive to off-center load applications. Preferably, the free end of the load application section has a substantially square cross-section and the fillet is formed by a portion of a cylinder surface.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
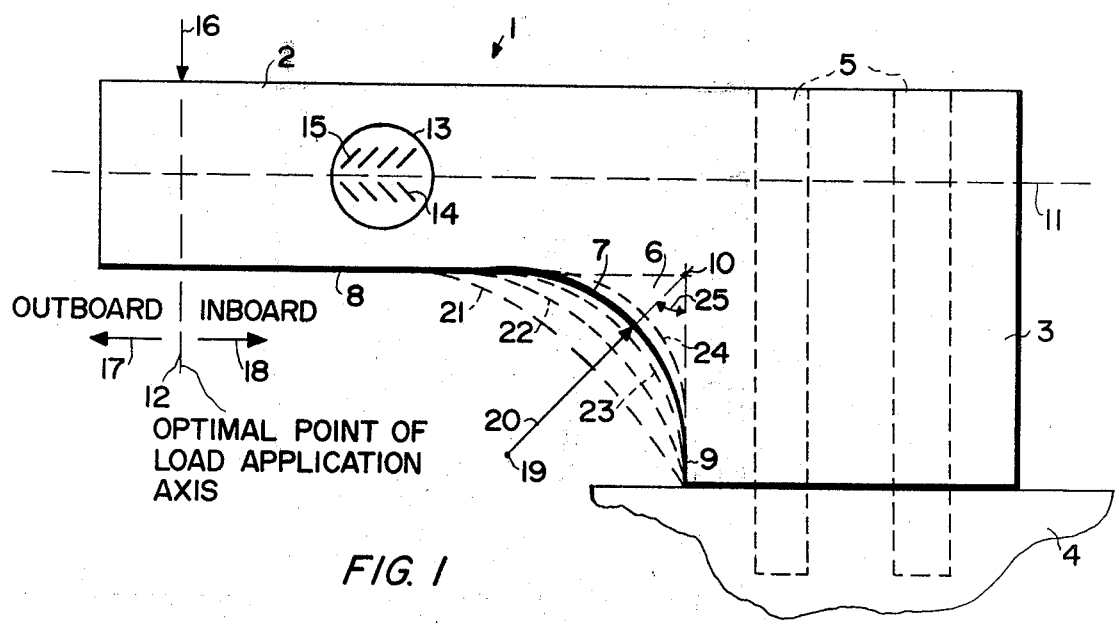
FIG. 1 is a side elevational view of a shear beam transducer according to the invention with a compensating fillet radius.

FIG. 1 shows a side elevational view of a shear beam transducer 1 having a free end 2 forming a load application section and a mounting section 3 secured to a base 4 by means of bolts not shown but extending through holes 5 in the mounting section 3. The cantilevered load application section 2 and the mounting section 3 merge into each other in a fillet zone 6 bounded by the compensated or rather compensating fillet 7 to be described in more detail below. The fillet zone 6 is further bounded by the extension of the lower surface 8 of the loading section and by the extension 9 of the inner surface of the mounting section 3 thereby forming a point of intersection 10.

The loading section 2 has a neutral axis 11 extending horizontally and an optimal point of load application axis 12 extending vertically through the free end of the loading section 2. A recess 13 is provided in each side wall of the loading section 2 and strain gauge elements 14 and 15 are conventionally arranged in these recesses 13.

A defined loading force 16 is initially applied in the direction of the optimal point of load application axis 12. However, in practical applications the actual load may be applied off-center relative to the axis 12 in the outboard direction indicated by the arrow 17 or in the inboard direction indicated by the arrow 18.

It has been found that the transducer may be made substantially insensitive to excursions in the inboard or outboard direction by giving the fillet radius 20 the correct compensating length which is ascertained empirically. The fillet radius 20 extends from its origin 19 toward the point of intersection 10 at an angle 25 of approximately 45°. For presently available shear beam transducers the length for the compensating fillet radius 20 may be within the range from 6 mm to 75 mm.

Figure 2:
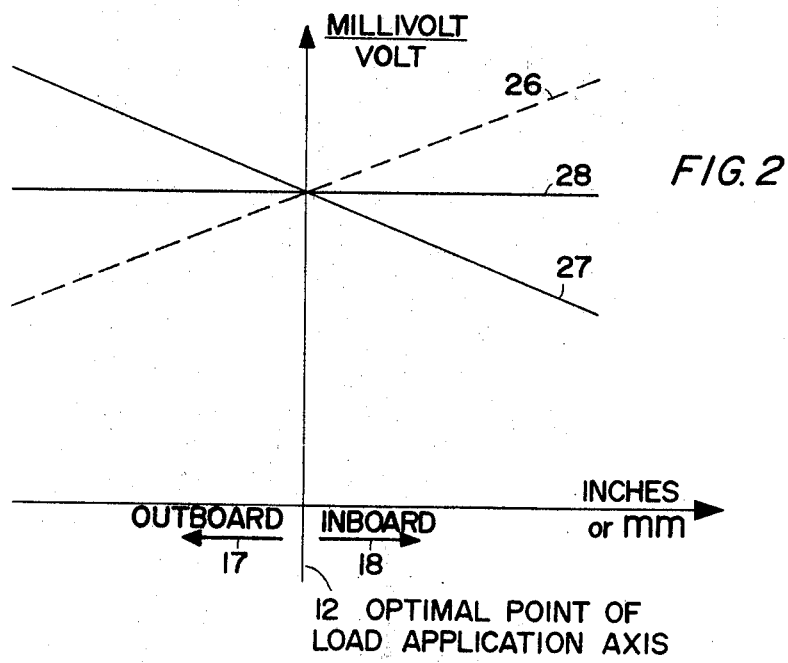
FIG. 2 shows various output sensitivity characteristics in millivolt per volt as a function of point of load excursions from the optimal point of load application axis.

FIGS. 1 and 2 illustrate the present method of compensating for the moment sensitivity by a mechanical fillet radius reduction in several steps, if necessary. Thus, initially the fillet is made intentionally larger as shown by the dashed line 21. Such an oversized fillet will result in a substantially uncompensated response characteristic of the moment sensitivity as shown at 26 in FIG. 2. On the other hand, it has been found that making the fillet too small as shown at 24 an over compensated response characteristic 27 will result as shown in FIG. 2. Therefore, the fillet size will, according to the invention, be gradually reduced as shown at 22 and 23 until a compensated response characteristic 28 is achieved for the fillet radius 20. When the critical size for the fillet radius 20 is achieved, excursions of the actual point of load application inboard or outboard relative to the optimal point of load application axis 12, will have substantially no effect on the output sensitivity of the transducer.

Figure 3:
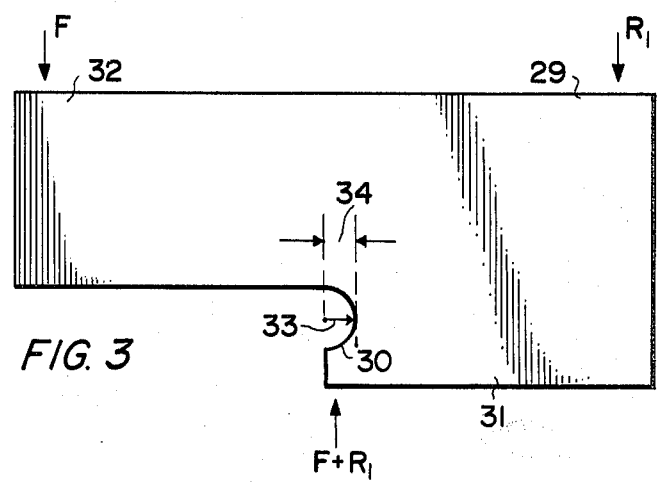
FIG. 3 shows a modification wherein the fillet is located substantially in the mounting section adjacent to the zone where the loading section and the mounting section merge.

FIG. 3 shows a modification in which the shear beam transducer 29 is provided with a substantially semi-circular fillet 30 located adjacent to the zone where the mounting section 31 and the loading section 32 merge. The fillet 30 has a radius 33 having a length 34 within the range of 6 mm to 50 mm.

Figure 4:
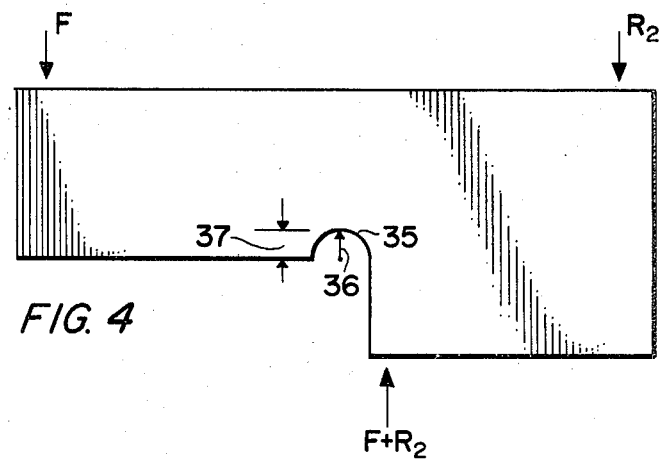
FIG. 4 is a further modification in which the fillet is located substantially in the loading section adjacent to the zone where the loading and mounting sections merge.

FIG. 4 shows an embodiment similar to that of FIG. 3 however here the substantially semicircular fillet 35 is located mostly in the loading section rather than in the mounting section as in FIG. 3. The fillet 35 again has a radius 36 with a length 37 within the above indicated range.

Figure 5:
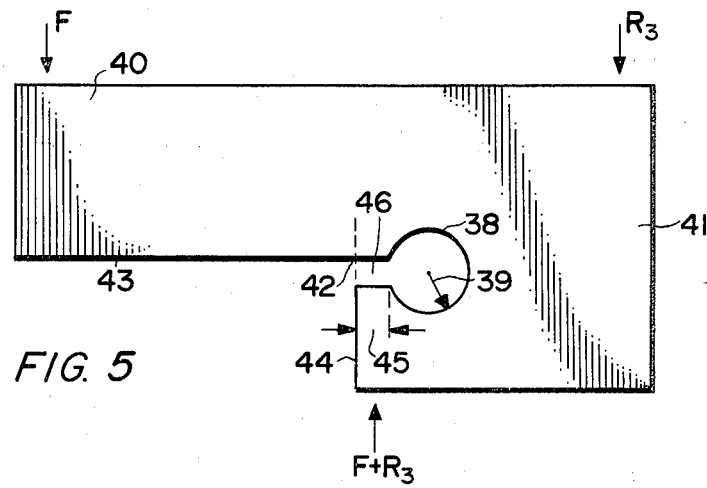
FIG. 5 shows an embodiment in which the fillet is substantially circular.

The modification of FIG. 5 shows a fillet of substantially circular shape 38 having a fillet radius 39 with a length within the range of 6 mm to 50 mm. The fillet 38 may be located anywhere substantially adjacent to or within the junction zone where the two transducer sections 40 and 41 merge. For example, the center of the radius 39 could be located on a line extending at 45° relative to the vertical and through the intersection 42 between the lower wall 43 of the loading section 40 and the inner wall 44 of the mounting section 41. Preferably, the fillet 38 is spaced by a spacing 45 from the wall 44 or from the wall 43. Said spacing 45 is preferably within the range of 6 mm to 50 mm. Further, the fillet 38 is connected to the wall 43 or 44 by a gap 46 which may have a width within the range of 1.5 mm to 6 mm.

In FIGS. 3, 4, and 5 the initial fillet will also be of such a size, that machining operations may be made until the correct fillet radius or the desired compensation is accomplished. In FIG. 5 the fillet 38 may be repeatedly drilled until the correct size is accomplished.

Although the invention has been described with reference to specific example embodiments, it will be appreciated, that it is intended, to cover all modifications and equivalents within the scope of the appendec claims.

What is claimed is:

1. A method for mechanically compensating the moment sensitivity of a shear beam transducer having a free end load application section, a mounting section and fillet means located substantially where said sections merge, comprising the following steps: providing said fillet means with an initial fillet radius which differs from a final compensating radius, establishing a load application axis extending through an optimal loading point in said load application section of said shear beam transducer, applying a defined load to the shear beam transducer in said optimal loading point, measuring the respective transducer output, applying said defined load off-center relative to said optimal loading point and again measuring the respective transducer output, comparing the two transducer outputs with each other to ascertain any difference between the two measurements, mechanically changing said initial fillet radius, applying said defined load again off-center and measuring the resulting output, comparing the outputs again to see whether the respective difference has been reduced relative to said first mentioned difference, and continuing the foregoing steps including the mechanical changing of the fillet radius until said difference is substantially zero, whereby the shear beam transducer is made substantially insensitive to off-center load applications, and whereby all shear beam transducers of the same type may be provided with the same compensating fillet radius once the foregoing steps have been performed for one shear beam transducer of that type.

2. The method of claim 1, further comprising ascertaining the optimal fillet radius for a given shear beam transducer type by employing the foregoing steps, and then machining the fillet radius of all transducers of the same type to said optimal fillet radius.

3. A shear beam transducer, comprising a free end load application section, a mounting section and fillet means located in a zone substantially where said sections merge, said fillet means comprising a radius adjusted to an optimum value such that the transducer is substantially insensitive to off-center load applications.

4. The shear beam transducer of claim 3, wherein said fillet radius has a length within the range of 6 mm to 75 mm.

5. The shear beam transducer of claim 3, wherein said fillet means comprise the shape substantially of a semi-circle the radius of which has been adjusted to said optimum value.

6. The shear beam transducer of claim 5, wherein said semi-circle is located substantially in said mounting section adjacent to said merging zone.

7. The shear beam transducer of claim 5, wherein said semi-circle is located substantially in said load application section adjacent said merging zone.

8. The shear beam transducer of claim 3, wherein said fillet means comprise the shape substantially of a circle the radius of which has been adjusted to said optimum value.

9. The shear beam transducer of claim 3, wherein said fillet radius extends along a line which includes an angle with the adjacent wall of said mounting section, said angle being within the range of 30° to 45°.

10. The shear beam transducer of claim 3, wherein said fillet means comprise the shape substantially of a circle, said circle being located to provide a spacing between a point on the circumference of said circle and a point where walls of said transducer sections intersect, said spacing being within the range of 0 mm and 50 mm.

11. The shear beam transducer of claim 3, wherein said load application section has a substantially square cross-section, and wherein said fillet means has the shape of a portion of a cylinder surface with a radius in the range of 6 mm to 75 mm.

* * * * *